United States Patent Office 3,427,424
Patented Feb. 11, 1969

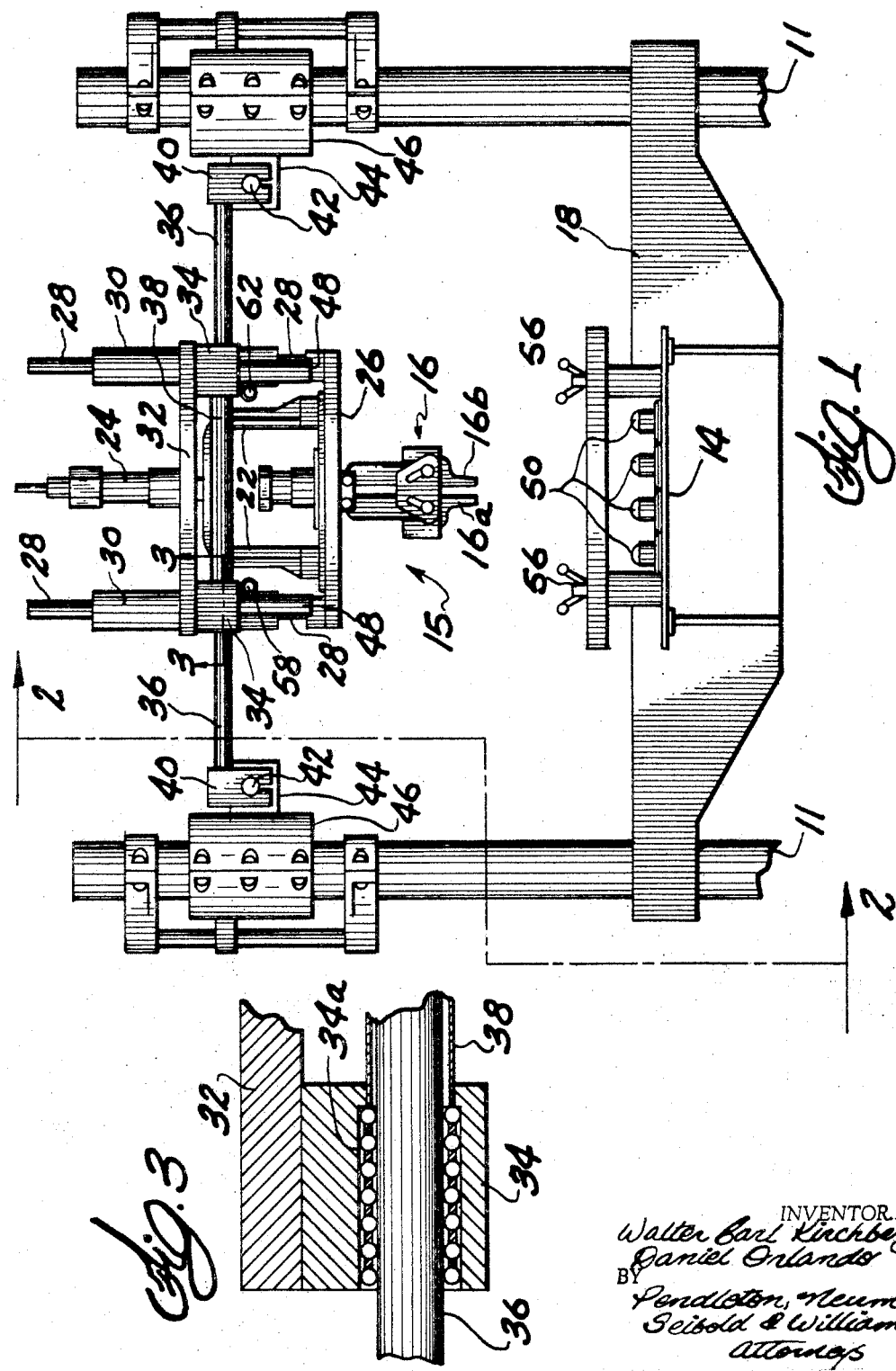

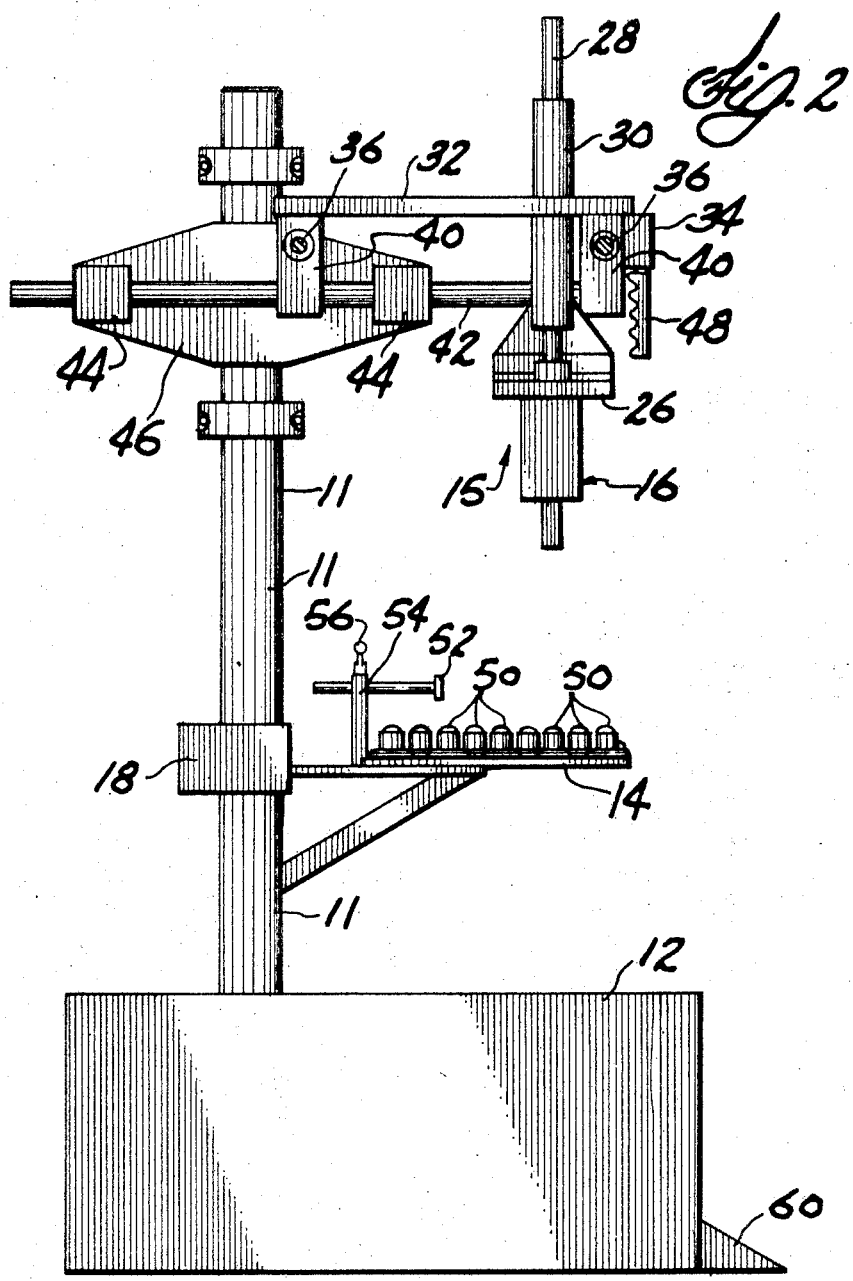

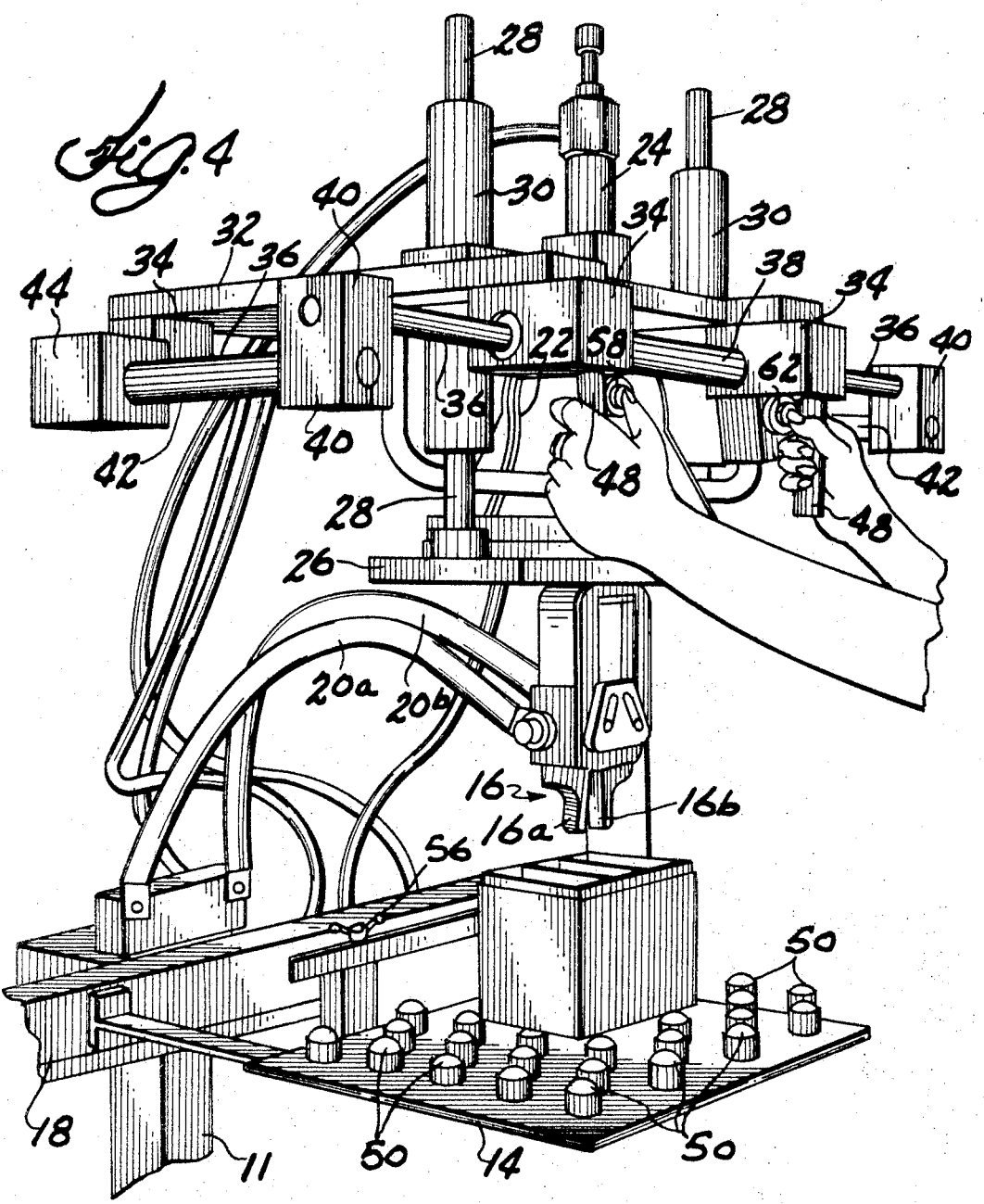

3,427,424
WELDING MACHINE
Walter Carl Kirchberger, Menomonee Falls, and Daniel Orlando, Brookfield, Wis., assignors to Globe-Union Inc., Milwaukee, Wis., a corporation of Delaware
Filed Oct. 24, 1965, Ser. No. 504,660
U.S. Cl. 219—78                3 Claims
Int. Cl. B23k 9/00, 11/00

ABSTRACT OF THE DISCLOSURE

A semi-automatic welding machine including a welding assembly having a welding head, and an article support both of which are carried by upright columns. The welding assembly is slidably mounted for manual movement in perpendicular directions generally parallel to a plane containing the article support. Control means are provided on the welding assembly for moving the welding head from a nonwelding position to a welding position and for moving the welding head back to the nonwelding position upon completion of the welding.

---

The present invention relates generally to a welding machine and, more specifically, to a hand-operated welding machine having a floating welding head.

Welding machines are presently available for automatically welding the intercell connections within a battery casing. However, such welding machines are set up for welding the intercell connections of batteries having conventional battery cell configurations. It is not practical to set up such welding machines for low production runs having unusual cell configurations or for repair work. Consequently, it has been desirable to provide a semi-automatic welding machine for low production run batteries or batteries having unusual battery cell configurations or batteries requiring repair work wherein the batteries require welds in one or more directions.

A primary object of the present invention is to provide a new and improved welding machine. More specifically, it is an object to provide a manually operable welding machine having a floating welding head. In this connection, it is an object to provide a new and improved semi-automatic welding machine.

A further object of the present invention is to provide a new and improved welding machine wherein the welding head is manually movable in planes parallel to an article support. More specifically, it is an object to provide such a machine wherein the welding head is movable in at least two horizontal directions. Still another object is to provide such a machine having an article support which allows an article supported thereby to be readily moved thereon.

A general object of the present invention is to provide a new and improved welding machine characterized in its simplicity and ease of operation.

Other objects and advantages of the invention will become apparent upon reading the attached, detailed description taken in conjunction with the drawings.

In one form of the present invention, a new and improved welding machine is provided which includes a welding member and an article support. Means are provided for supporting the welding member relative to the article support for movement between a nonwelding position and a welding position. The welding member supporting means allows for movement of the welding member in planes parallel to the article support. Control means are provided which are operable to move the welding member to the welding position, to initiate a welding cycle, and to move the welding member to the nonwelding position at the completion of a welding cycle.

For the purpose of providing a detailed description, reference will now be made to the drawings wherein:

FIG. 1 is a front elevational view of a portion of a welding machine constructed in accordance with the teachings of the present invention;

FIG. 2 is a view taken substantially along line 2—2 in FIG. 1 showing the entire welding machine;

FIG. 3 is a view taken substantially along line 3—3 in FIG. 1; and

FIG. 4 is a perspective view of a portion of the welding machine shown in FIGS. 1 and 2.

While the invention has been shown and will be described in some detail with reference to a particular exemplary embodiment thereof, there is no intention that it be limited to such detail. Quite to the contrary, it is intended here to embrace all modifications, alternatives and equivalents falling within the spirit and scope of the invention, as defined by the appended claims.

Referring now to the drawings, a welding machine constructed in accordance with the teachings of the present invention is shown. The welding machine is supported by a pair of columns 11 extending upwardly from a supporting base 12. The welding machine includes an article support 14 supported by and extending outwardly from the upright columns 11 and welding assembly 15 including a welding head 16 likewise supported by the upright columns 11. As will become apparent, the welding assembly is mounted for movement toward and away from the article support to respective welding and nonwelding positions. The article support 14 is suitably secured to a mounting block 18, such as by welding, and the mounting block 18 is in turn suitably secured to the upright columns 11. The mounting block 18 may be releasably secured to the columns 11 by suitable means so that the mounting block and thus the article support 14 may be vertically adjusted along the columns 11 relative to the welding assembly.

Briefly speaking, the exemplary welding assembly includes, in addition to the welding head 16, a yoke assembly to which the welding head is secured. As may be seen, the yoke assembly includes a yoke 22 which is secured to the driving shaft of a double-acting hydraulic cylinder 24 and includes a guide post mounting plate 26 which is secured to guide shafts 28. The guide shafts 28 are journaled in bushing housings 30 for vertical movement relative to the bushing housings. The hydraulic cylinder 24 is provided to drive the yoke assembly and the welding head 16 toward and away from the article support 14 to the respective welding and nonwelding positions. The entire welding assembly 15 is mounted on a main support plate 32 which is connected to the columns 11.

As may be seen, the welding head includes a pair of welding jaws 16a and 16b which are adapted to be moved toward and away from each other into respective welding and nonwelding relationship with an article to be welded thereby. Welding current is supplied to the welding head 16 via conductors 20a and 20b (FIG. 4). Since the details of the welding head 16 itself do not constitute a part of the present invention, such details will not be set forth herein. However, the details of a typical welding head 16, which may be utilized in the welding machine constructed in accordance with the teachings of the present invention, are disclosed in the copending application of Buttke et al., Ser. No. 268,359, filed on Mar. 27, 1963, which is assigned to the assignee of this application.

In accordance with the present invention, the welding assembly 15 is floatingly connected to the upright columns 11 so that the welding assembly is freely movable in directions parallel to the article support 14. In the exemplary arrangement, the welding assembly, and thus the welding head 16, is floatingly connected to the columns 11 for movement in transverse directions parallel to the article support. More specifically, the main support plate 32 is floatingly mounted for movement in perpendicular directions parallel to the article support 14. Referring to FIGS. 1 and 2, the mounting plate 32 is mounted for manual movement to the right and left as viewed therein.

For the purpose of allowing the support plate 32, and thus the entire welding assembly 15, to be freely movable to the right and left as viewed in FIG. 1, the support plate 32 is secured to four bushing housings 34 (three of the housings being shown in FIG. 4). In the exemplary arrangement, supporting shafts 36 are provided adjacent the front and rear of the support plate 32, as viewed in FIG. 2, which are journaled through ball bushings provided in the bushing housings 34 to allow for movement of the bushing housings, and thus the welding assembly, along the shafts 36. A typical ball bushing 34a is shown in FIG. 3 which is disposed within a bushing housing 34 and has a shaft 36 journaled therethrough. Additionally, it will be seen (FIGS. 1, 3 and 4) that, in the exemplary arrangement, shaft sleeves 38 are disposed between the bushing housings 34 for accommodating the shafts 36. Moreover, shaft end clamps 40 are provided at the opposite ends of each shaft 36 for engaging the bushing housings 34, as the welding assembly is moved to the right or left as viewed in FIG. 1, to limit the movement of the welding assembly.

For the purpose of allowing the mounting plate 32, and thus the welding assembly 15, to be freely movable to the right and left, as viewed in FIG. 2, a pair of shafts 42 are provided adjacent opposite ends of the mounting plate 32. The shafts 42 are secured to the shaft end clamps 40 associated with the shafts 36 and are journaled in ball bushings provided within pairs of bushing housings 44 which are secured to mounting blocks 46. The mounting blocks 46 are in turn suitably secured to the upright columns 11. The ball bushings provided within the bushing housings 44 correspond to the ball bushing 34a shown in FIG. 3 so that the shafts 42, and thus the welding assembly 15, are freely movable to the right and left as viewed in FIG. 2.

In view of the foregoing, it will be readily apparent that the welding assembly 15 is freely movable in transverse directions parallel to the article support 14. For the purpose of facilitating manual movement of the welding assembly by an operator, a pair of handles 48 are provided which extend downwardly from the bushing housings 34 at the front of the welding machine. Thus, an operator may grasp the handles 48 and freely move the welding assembly to the right or left as viewed in FIG. 1 and or to the front or rear as viewed in FIG. 2, the welding assembly being simultaneously movable in transverse directions.

For the purpose of allowing an article supported on the article support 14 to be readily movable thereon, ball bearing support members 50 are provided on the upper surface of the article support 14. Thus, articles supported thereby may readily be slid or rolled along the article support to selected positions. A stop plate 52 is mounted at the rear of the article support 14 by a clamp block 54 for limiting rearward movement of articles postioned on the support. Clamp members 56 cooperate with the clamp block 54 to releasably lock the stop plate 52 in place so that the stop plate may be moved to a desired position. It will be apparent that an article to be welded, such as a battery casing as shown in FIG. 4, may be positioned against the stop plate 52 in any desired position.

For the purpose of providing a better understanding of the welding machine constructed in accordance with the teachings of the present invention, a brief description of the operation thereof will now be set forth. An operator initially grasps the handles 48 (FIGS. 1 and 4) and moves the welding assembly 15 until the welding head 16 is positioned above an article, such as a battery which is, supported by the article support 14 and which is to be welded. The operator then depresses a thumb switch 58 positioned adjacent the left hand handle 48 (FIGS. 1 and 4) which actuates the hydraulic cylinder 24 so that the welding head 16 is driven downwardly toward the battery casing to the welding position. As the welding head is driven downwardly toward the battery casing, the operator continues to adjust the position of the welding assembly and thus the position of the welding head so that a desired portion of the battery casing is received between the welding jaws 16a and 16b. When proper location of the welding jaws 16a and 16b is achieved, the operator depresses a foot pedal 60 (FIG. 2) which causes the welding jaws 16a and 16b to be driven toward each other into welding relationship with the portion of the intercell connection to be welded. The operator then depresses a thumb switch 62 adjacent the right hand handle 48 (FIGS. 1 and 4) which causes welding current to flow through the welding head so that the desired weld is made. Subsequent to the completion of the welding cycle, the system functions to automatically open the welding jaws 16a and 16b and render the hydraulic cylinder 24 operative to raise the welding head 16 to the nonwelding position.

In view of the foregoing, it will be seen that an extremely flexible, hand-operated, semi-automatic welding machine has been provided which allows for placing welds in any position or direction by movement of the welding assembly relative to the article support and/or by movement of the article to be welded on the article support. Moreover, it will be apparent that the disclosed welding machine will be particularly useful for performing welding operations on low production run batteries having unusual battery cell configurations or wherein batteries are being manufactured on low production runs or batteries requiring repair work.

What is claimed is:

1. In a welding machine, the combination which comprises a welding member, an article support, means for supporting the welding member relative to the article support for movement toward and away from the support to welding and nonwelding positions, the welding member supporting means including first and second transversely disposed supports, the first support being supported by the second support for free manual movement along said second support, means for mounting the welding member on the first support and allowing the welding member to be freely manually moved along the first support, and control means operable to move the welding member between the welding and nonwelding positions.

2. In a welding machine, the combination which comprises a welding member, a main vertical support, a horizontal article support mounted on the main support, a stationary horizontal support mounted on the vertical support, a movable horizontal support transversely disposed relative to the stationary support, means for mounting the movable support on the stationary support so that the movable support is freely manually movable therealong, means for mounting the welding member on the movable support so that the welding member is freely manually movable therealong and is supported for movement toward and away from the article support to welding and nonwelding positions, and control means operable to move the welding member between the welding and nonwelding positions.

3. In a welding machine, the combination which comprises a welding member, a main vertical support, a horizontal article support having rollers on the supporting surface so that articles supported thereby are freely movable thereon and mounted on the main support, a stationary horizontal support mounted on the vertical support, a movable horizontal support, means for mounting the movable support on the stationary support so that the movable support is freely manually movable along the stationary support, means for mounting the welding member on the movable support so that the welding member is freely manually movable therealong in a direction transverse to the direction of movement thereof and is supported for movement toward and away from the article support to welding and nonwelding positions, means operable to move the welding member to the welding position, means operable to initiate a welding cycle, and means operable responsive to the completion of a welding cycle for moving the welding member to the nonwelding position.

References Cited

UNITED STATES PATENTS

| 1,067,478 | 7/1913 | Gravell | 219—86 |
| 1,242,171 | 10/1917 | Geisenhöner | 219—80 |
| 1,884,658 | 10/1932 | Gladkov et al. | 219—62 X |

RICHARD M. WOOD, *Primary Examiner.*

BARRY A. STEIN, *Assistant Examiner.*